US009506793B2

(12) United States Patent
Sukemura et al.

(10) Patent No.: US 9,506,793 B2
(45) Date of Patent: Nov. 29, 2016

(54) CORIOLIS FLOWMETER HAVING A CROSS-SECTIONAL AREA OF CHANNELS OF THE MANIFOLDS ENABLING A REDUCTION IN PRESSURE LOSS

(71) Applicant: OVAL CORPORATION, Tokyo (JP)

(72) Inventors: Norio Sukemura, Tokyo (JP); Takeshi Motomiya, Tokyo (JP)

(73) Assignee: OVAL CORPORATION, Tokyo (JP)

( * ) Notice: Subject to any disclaimer, the term of this patent is extended or adjusted under 35 U.S.C. 154(b) by 0 days.

(21) Appl. No.: 14/395,823

(22) PCT Filed: Mar. 13, 2013

(86) PCT No.: PCT/JP2013/057934
§ 371 (c)(1),
(2) Date: Oct. 21, 2014

(87) PCT Pub. No.: WO2013/161457
PCT Pub. Date: Oct. 31, 2013

(65) Prior Publication Data
US 2015/0082916 A1    Mar. 26, 2015

(30) Foreign Application Priority Data
Apr. 26, 2012  (JP) ................. 2012-101144

(51) Int. Cl.
*G01F 1/84* (2006.01)
(52) U.S. Cl.
CPC ............ *G01F 1/849* (2013.01); *G01F 1/8409* (2013.01); *G01F 1/8477* (2013.01); *G01F 1/8495* (2013.01)
(58) Field of Classification Search
None
See application file for complete search history.

(56) References Cited

U.S. PATENT DOCUMENTS 5,661,232 A     8/1997  Van Cleve et al.
5,850,039 A *  12/1998  Van Cleve ............ G01F 1/8409
                                                         73/861.357

(Continued)

FOREIGN PATENT DOCUMENTS

JP      4-22209       4/1992
JP      11-230804     8/1999

(Continued)

OTHER PUBLICATIONS

International Search Report issued Jun. 25, 2013 in International (PCT) Application No. PCT/JP2013/057934 with English translation.

*Primary Examiner* — Harshad R Patel
(74) *Attorney, Agent, or Firm* — Wenderoth, Lind & Ponack, L.L.P.

(57) ABSTRACT

Provided is a Coriolis flowmeter capable of achieving suppression of a pressure loss of a manifold and the like. A channel (15) of a manifold (8) includes a pipe-side opening portion (16), tube-side opening portions (17), and a channel branching portion (18) as shaping portions therefor, and the channel sectional area in a range of from the channel branching portion (18) toward the tube-side opening portions (17) is linearly decreased. A branching wall tip end (20) of a branching wall (19) extending from a position of the channel branching portion (18) to the other end of a manifold body (12) is arranged at the channel branching portion (18). The sectional shape of the channel (15) is a circular shape at a position of the pipe-side opening portion (16), and is changed to D-shapes at the position of the channel branching portion (18) by the branching wall tip end (20).

16 Claims, 12 Drawing Sheets

(56) References Cited

U.S. PATENT DOCUMENTS 6,286,373 B1 * 9/2001 Lister .................... G01F 1/8409
                                                           73/861.355
6,450,042 B1 * 9/2002 Lanham .................. B29C 33/52
                                                           73/861.357
2010/0263456 A1 * 10/2010 Griffin .................. G01F 1/8409
                                                           73/861.357

FOREIGN PATENT DOCUMENTS

| | | |
|---|---|---|
| JP | 2000-505557 | 5/2000 |
| JP | 2009-180699 | 8/2009 |

* cited by examiner (a)

(b)

(c)

(a)

(b)

(c)

(d)

CORIOLIS FLOWMETER HAVING A CROSS-SECTIONAL AREA OF CHANNELS OF THE MANIFOLDS ENABLING A REDUCTION IN PRESSURE LOSS

TECHNICAL FIELD

The present invention relates to a Coriolis flowmeter including manifolds arranged at both end portions of flow tubes, respectively.

BACKGROUND ART

A Coriolis flowmeter is a mass flowmeter utilizing a fact that a Coriolis force acting on a flow tube is proportional to a mass flow rate when the flow tube through which a fluid to be measured flows is supported at both ends thereof and vibration is applied about a support point in a direction perpendicular to a flow direction of the flow tube.

The Coriolis flowmeter is well known and a shape of a flow tube in the Coriolis flowmeter is roughly classified into a straight tube shape and a curved tube shape. When two flow tubes are arranged, manifolds (branching pipes) for branching a channel into two channels are arranged at both end portions of the flow tubes, respectively, corresponding to an inflow port side and an outflow port side.

CITATION LIST

Patent Literature

[PTL 1] JP 04-22209 B
[PTL 2] JP 2009-180699 A

SUMMARY OF INVENTION

Technical Problems

When a shaping portion for the channel of the manifold is configured to simply branch the channel, the channel sectional area at the time of completion of the branching becomes twice as large as the channel sectional area on a pipe connection side. Specifically, when it is assumed that a circular shape 101 illustrated in FIG. 12(a) is a channel sectional shape on the pipe connection side, the circular shape 101 is easily divided into two parts with use of a shaping portion configured to firstly transform the circular shape 101 in directions indicated by the arrows P, change a division transition shape 102 illustrated in FIG. 12 (b) to a figure-of-eight division transition shape 103 illustrated in FIG. 12(c), and to finally transform the figure-of-eight division transition shape 103 into two circular shapes 104 illustrated in FIG. 12(d), thereby completing the division of the circular shape 101. As understood from the figures, however, the sectional area is increased and thus the channel sectional area at the time of completion of the branching becomes twice as large as the channel sectional area on the pipe connection side (note that, in order to enhance the measurement sensitivity of general Coriolis flowmeters, the sectional area of the flow tube is set smaller than the pipe sectional area, and hence the diameter of the channel is decreased in conformity with the diameter of the flow tube after the completion of the branching, thus leading to abrupt decrease in sectional area, that is, abrupt flow contraction).

By the way, in the above-mentioned shaping portion, the channel sectional area is increased within a period until the circular shape 101 is divided into the two circular shapes 104, and the channel sectional area is increased in a short section inside the manifold. Therefore, there is a problem in that the pressure loss is also increased along with the increase in sectional area.

The increase in sectional area of the manifold not only causes the above-mentioned increase in pressure loss, but also causes separation of flows and clogging in a case where the branching ratio is changed, which may lead to many disadvantages such as decrease in mass flow rate measurement sensitivity.

The present invention has been made in view of the above-mentioned circumstances, and it is therefore an object of the present invention to provide a Coriolis flowmeter capable of achieving suppression of a pressure loss of a manifold and the like.

Solution to Problems

In order to solve the above-mentioned problems, according to a first example of the present invention, there is provided a Coriolis flowmeter configured to drive flow tubes and detect a phase difference and/or a vibration frequency proportional to a Coriolis force acting on each of the flow tubes, to thereby determine a mass flow rate and/or density of a fluid to be measured, which flows through the each of the flow tubes, the Coriolis flowmeter including manifolds arranged at both end portions of the each of the flow tubes, in which a number of the flow tubes is set to an even number, in which a channel of each of the manifolds includes, as shaping portions therefor: a pipe-side opening portion arranged close to a pipe to which the Coriolis flowmeter is to be installed; tube-side opening portions arranged close to the flow tubes, a number of the tube-side opening portions being equal to the number of the flow tubes; and a channel branching portion to be branched corresponding to the number of the flow tubes, in which areas of branching portion sectional shapes of the channel branching portion are set equal to each other, and in which a channel sectional area in a range of from the channel branching portion toward the tube-side opening portions is set so as to be prevented from becoming larger than the areas of the branching portion sectional shapes.

In a second example of a Coriolis flowmeter of the present invention, which refers to the first example of the Coriolis flowmeter, the channel sectional area in the range of from the channel branching portion toward the tube-side opening portions is set so as to be linearly decreased from the areas of the branching portion sectional shapes.

In a third example of a Coriolis flowmeter of the present invention, which refers to the first or second example of the Coriolis flowmeter, each of the branching portion sectional shapes of the channel branching portion is set to a non-circular shape, and a shape of each of the tube-side opening portions is set to a circular shape.

In a fourth example of a Coriolis flowmeter of the present invention, which refers to the first, second, or third example of the Coriolis flowmeter, the number of the flow tubes is set to two, the each of the branching portion sectional shapes of the channel branching portion is set to a D-shape, and the shape of the each of the tube-side opening portions is set to the circular shape.

In a fifth example of a Coriolis flowmeter of the present invention, which refers to the first, second, third, or four example of the Coriolis flowmeter, the each of the flow tubes is formed into a straight tube shape or a curved tube shape, and when the each of the flow tubes is formed into the curved tube shape, a region in the range of from the channel branching portion toward the tube-side opening portions is formed into a curved shape.

In a sixth example of a Coriolis flowmeter of the present invention, which refers to the first, second, third, fourth, or fifth example of the Coriolis flowmeter, when a transition portion toward complete branching is arranged between the channel branching portion and the pipe-side opening portion, the channel sectional area of the transition portion is set so as to be prevented from becoming larger than an area of an opening shape of the pipe-side opening portion.

Advantageous Effects of Invention

According to the first example of the present invention, the channel of the manifold includes the tube-side opening portions, the channel branching portion, and the pipe-side opening portion as the shaping portions therefor, and the channel sectional area in the range of from the channel branching portion toward the tube-side opening portions is not increased. Thus, such an effect is attained that suppression of the pressure loss and the like, that is, optimization of the pressure loss and the like can be achieved.

According to the second example of the present invention, the channel sectional area in the range of from the channel branching portion toward the tube-side opening portions is linearly decreased so that the channel sectional area is not increased. Thus, such an effect is attained that the suppression of the pressure loss and the like, that is, the optimization of the pressure loss and the like can be achieved.

According to the third example of the present invention, as the shaping portions for preventing the increase in channel sectional area, the sectional shape in the range of from the channel branching portion toward the tube-side opening portions is changed from the non-circular shape to the circular shape. Thus, such an effect is attained that the present invention can contribute to the suppression of the pressure loss and the like, that is, the optimization of the pressure loss and the like.

According to the fourth example of the present invention, when two flow tubes are arranged, as the shaping portions for preventing the increase in channel sectional area, the sectional shape in the range of from the channel branching portion toward the tube-side opening portions is changed from the D-shape to the circular shape. Thus, such an effect is attained that the present invention can contribute to the suppression of the pressure loss and the like, that is, the optimization of the pressure loss and the like.

According to the fifth example of the present invention, such an effect is attained that the present invention is applicable to the flow tube having the straight tube shape or the curved tube shape.

According to the sixth example of the present invention, the transition portion adaptable for transition toward complete branching may be arranged without the immediate branching at the position of the channel branching portion. In this case, when the transition portion is also formed so that the channel sectional area is not increased, such an effect is attained that the suppression of the pressure loss and the like, that is, the optimization of the pressure loss and the like can be achieved.

DESCRIPTION OF EMBODIMENTS

A Coriolis flowmeter according to the present invention includes manifolds arranged at both end portions of flow tubes, respectively. Each of the manifolds is set so that the channel sectional area in a range of from a channel branching portion toward tube-side opening portions is not increased.

First Embodiment

Figure 1:
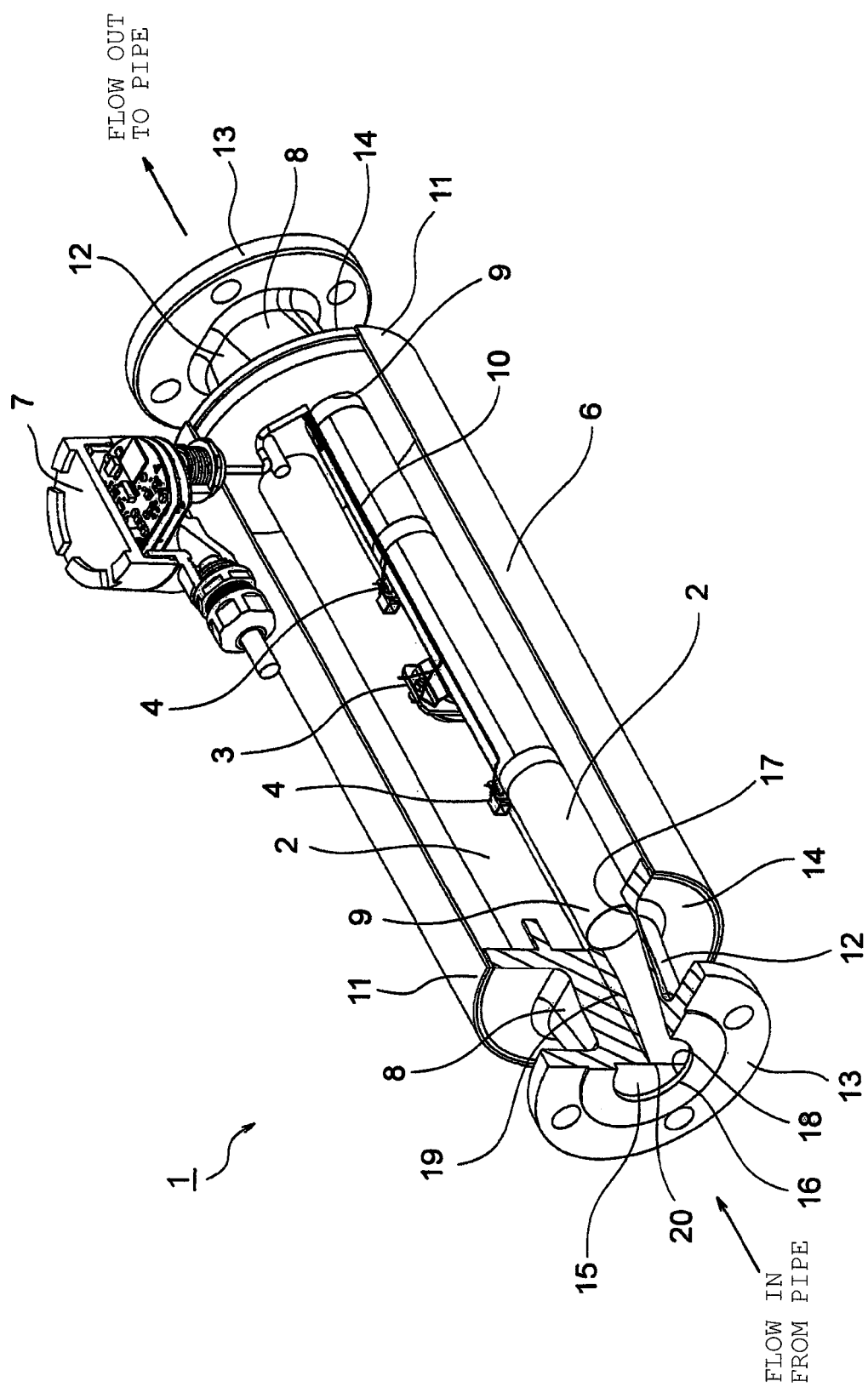
FIG. 1 is a structural view illustrating a Coriolis flowmeter according to the present invention.
Figure 2:
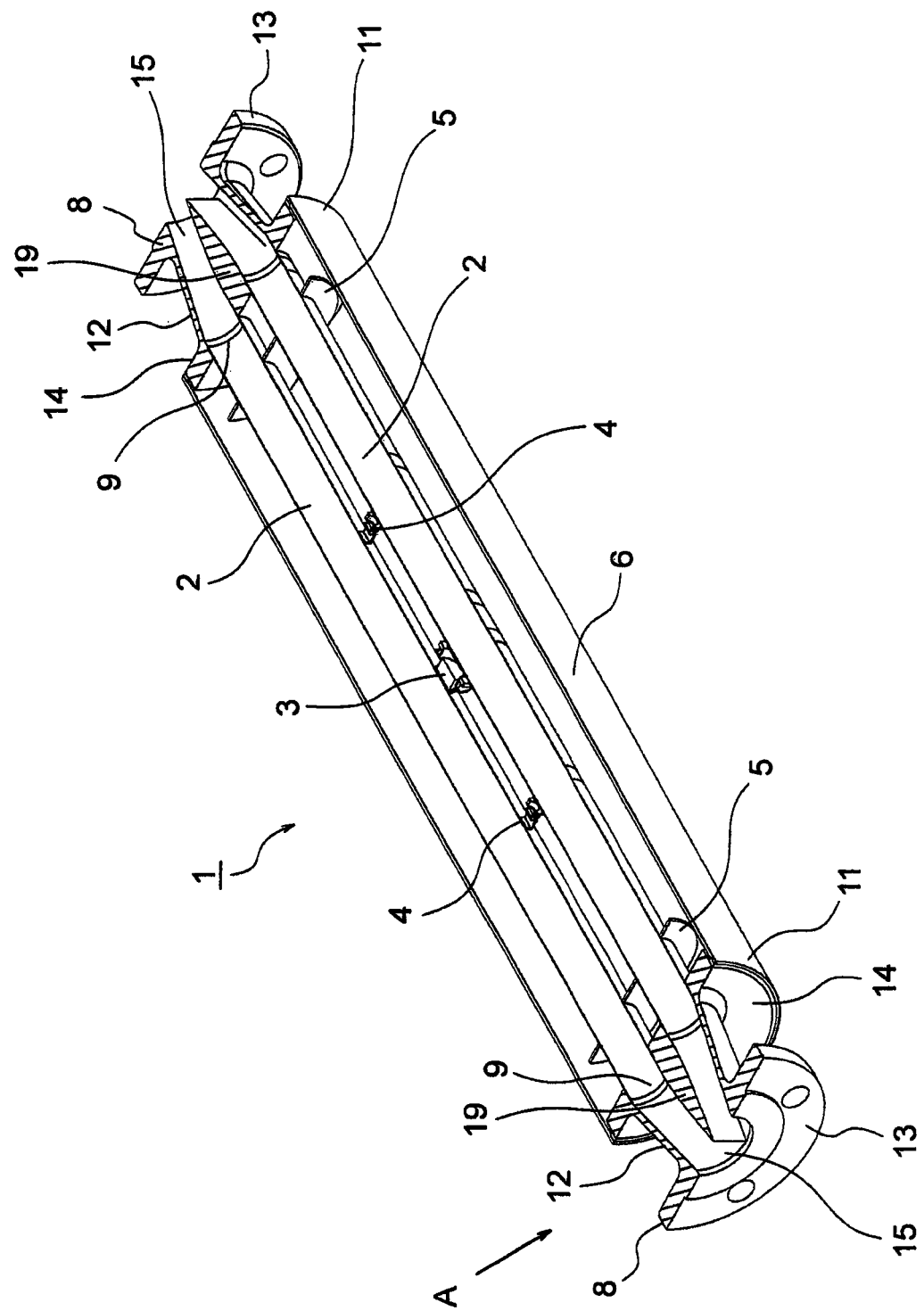
FIG. 2 is a view illustrating the Coriolis flowmeter of FIG. 1, which is cut into a half along a horizontal direction.
Figure 3:
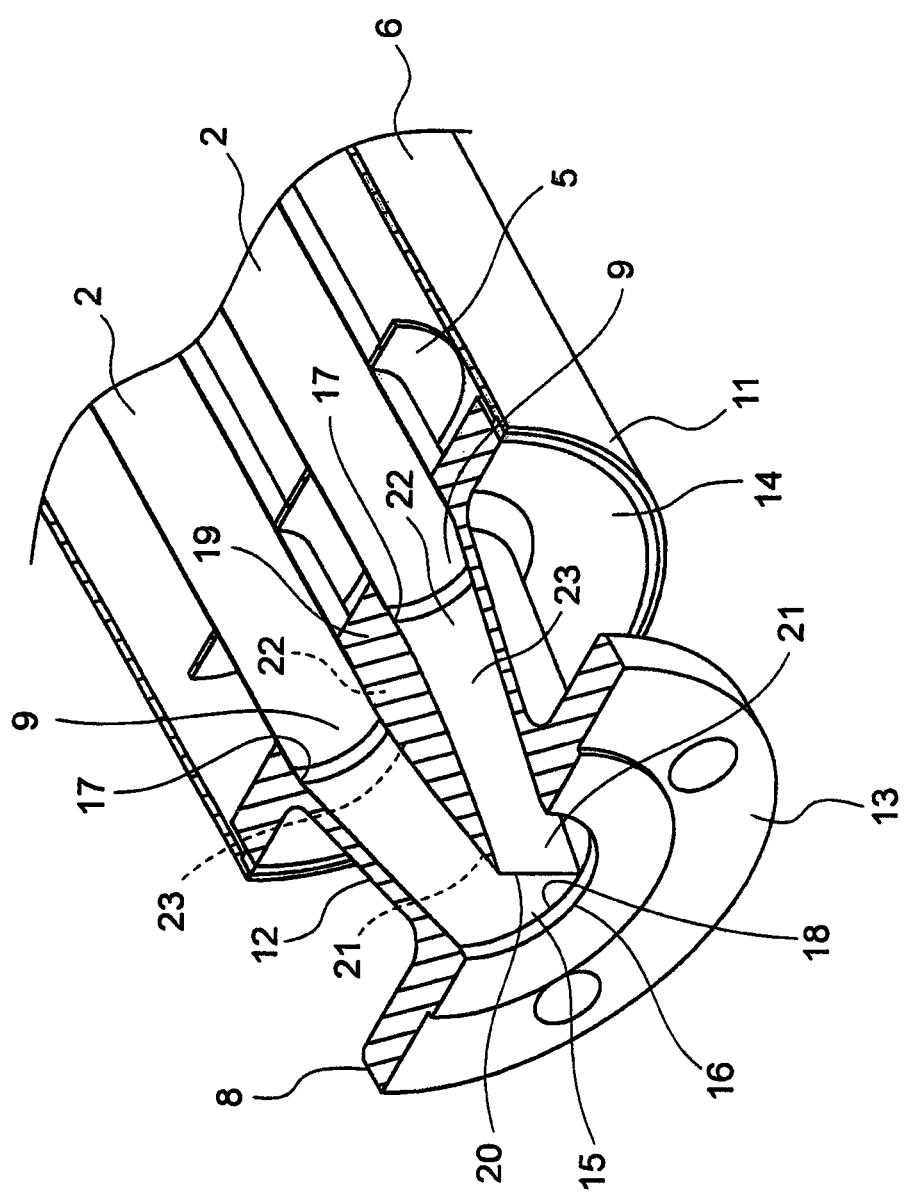
FIG. 3 is an enlarged view illustrating the region A of FIG. 2.
Figure 4:
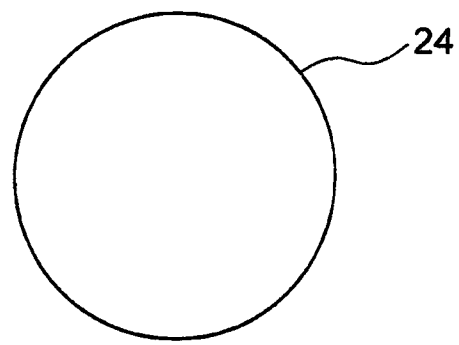
FIGS. 4(a)-4(c) are views each illustrating a channel sectional shape including a channel branching portion.
Figure 4:
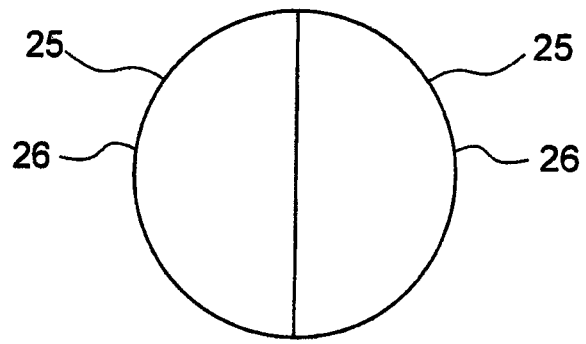
Figure 4:
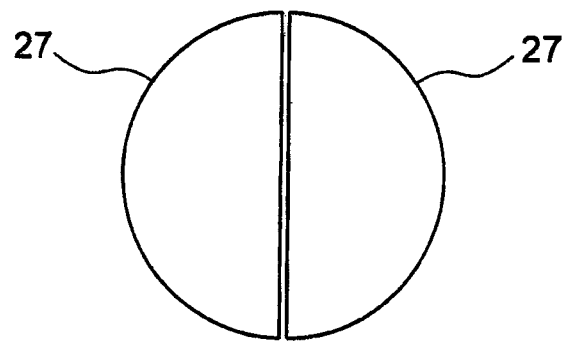
Figure 6:
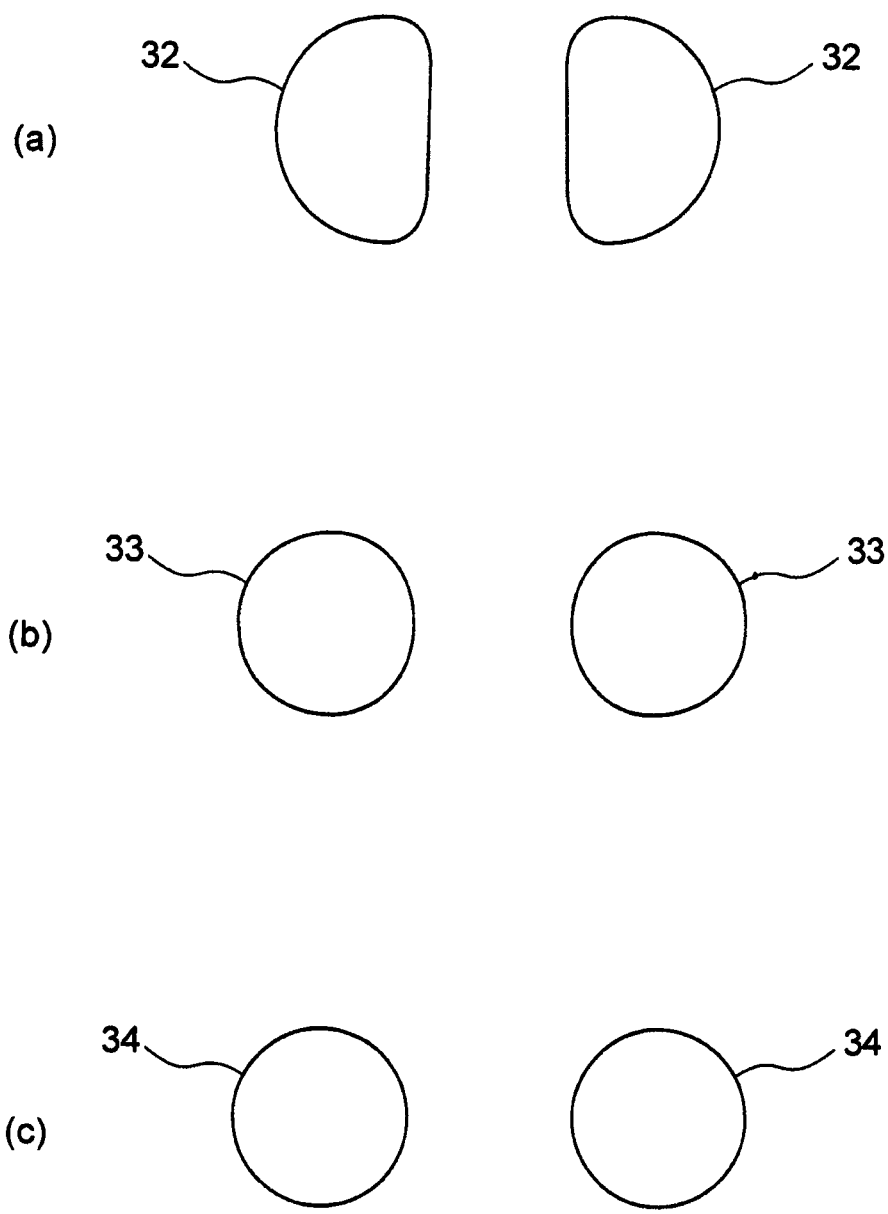
FIGS. 6(a)-6(c) are views each illustrating a channel sectional shape including the tube-side opening portions.
Figure 7:
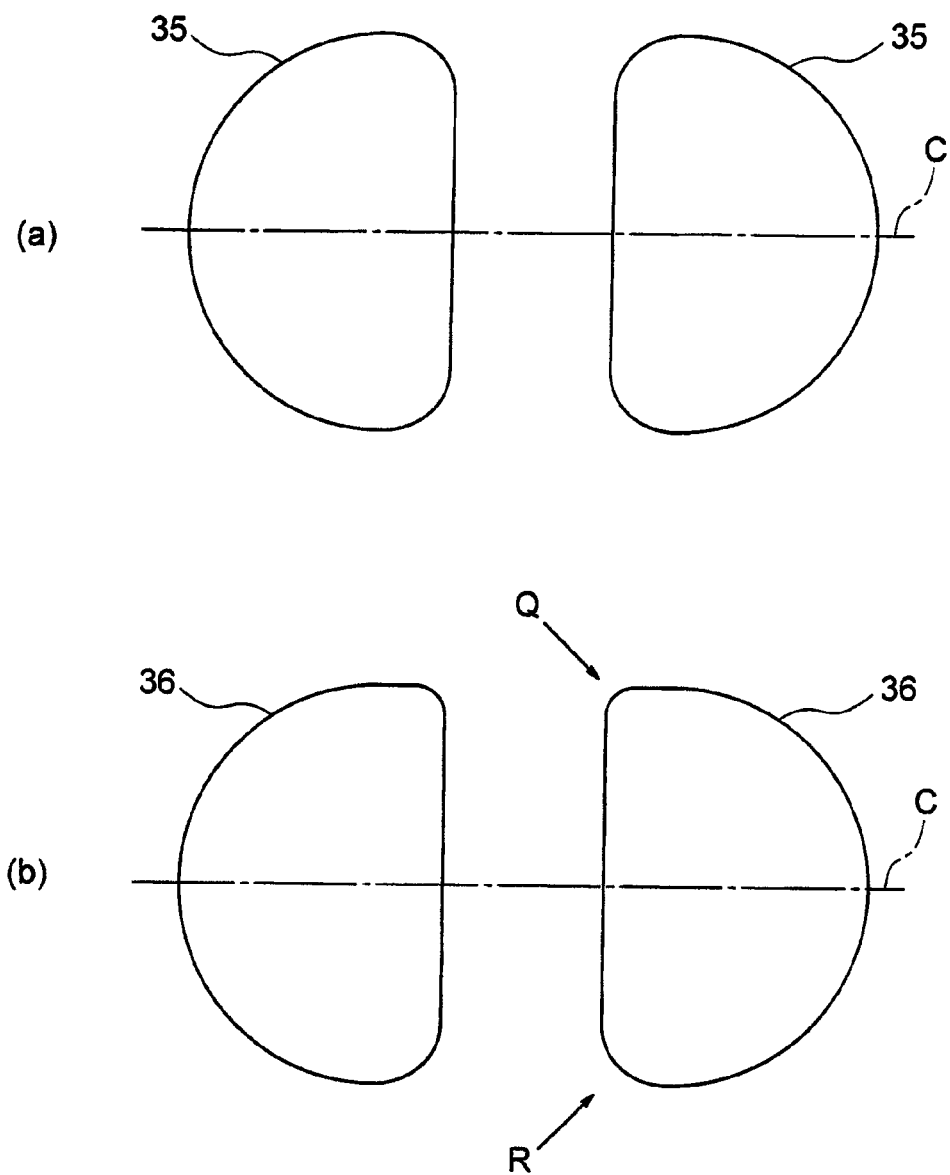
FIGS. 7(a) and 7(b) are views each illustrating a modification example of the channel sectional shape.
Figure 8:
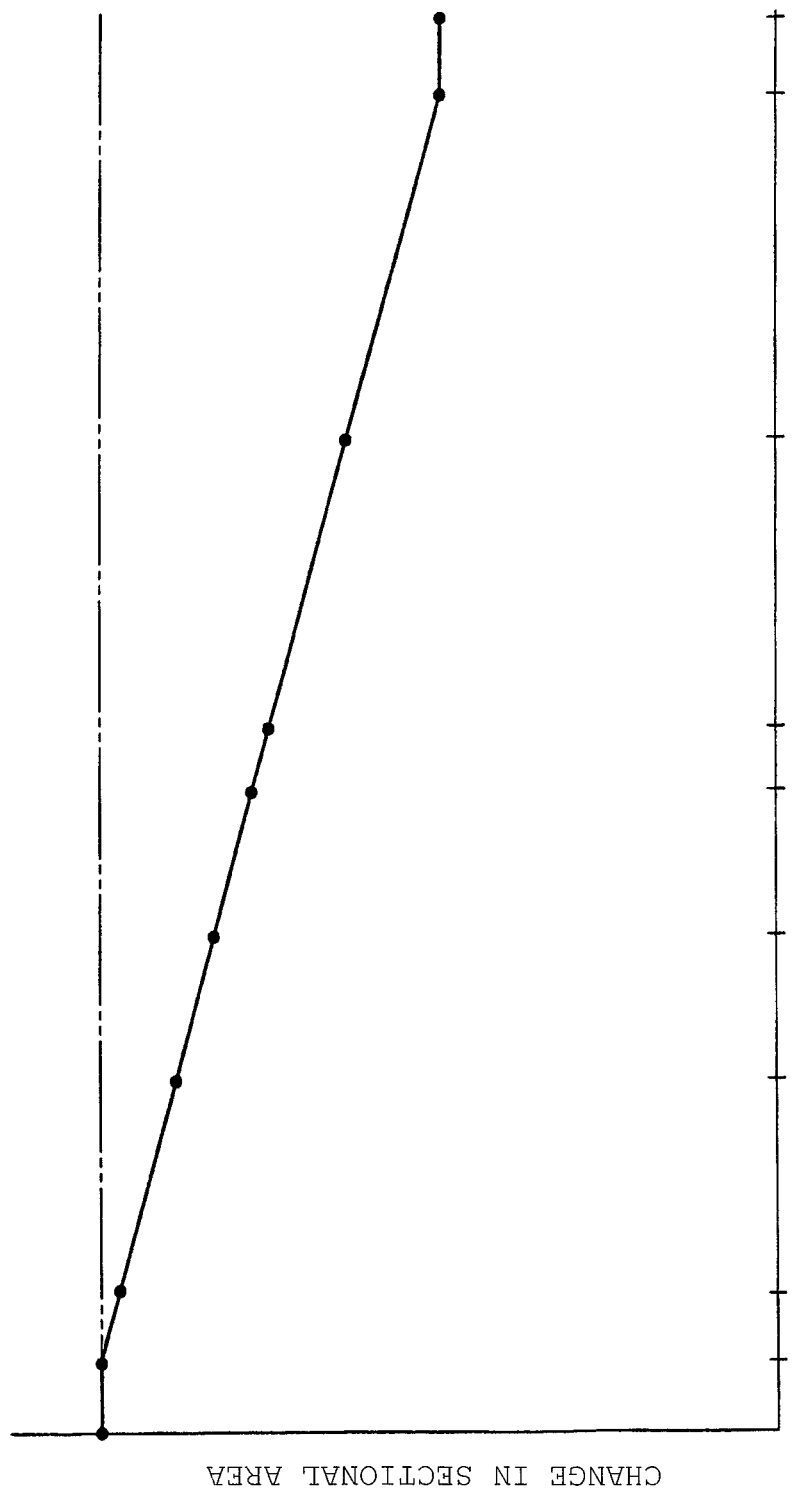
FIG. 8 is a graph showing a change in sectional area.
Figure 9:
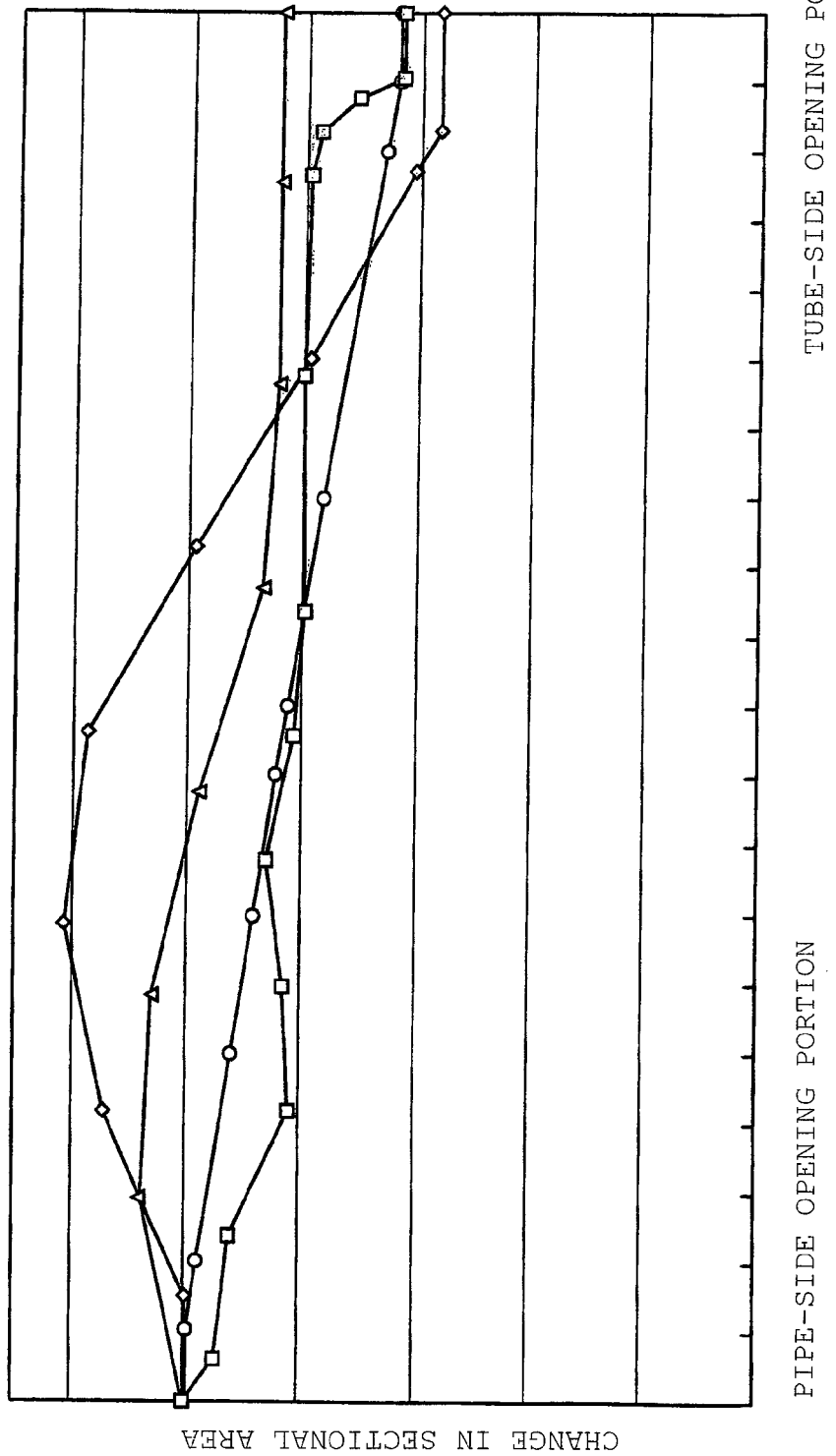
FIG. 9 is a graph showing the change in sectional area (including those of comparative examples).
Figure 10:
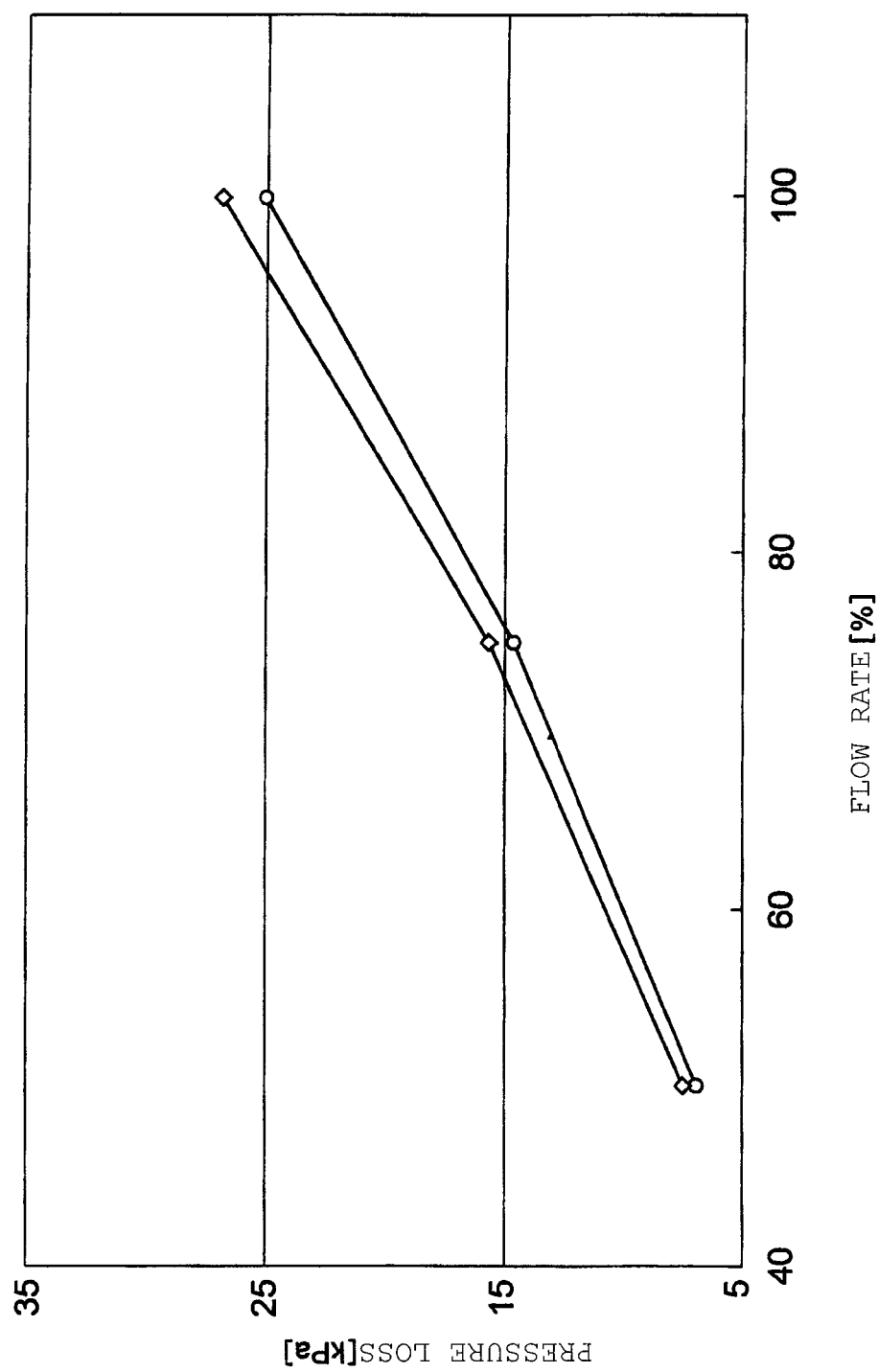
FIG. 10 is a graph showing pressure losses.

Now, a first embodiment of the present invention is described with reference to the drawings. FIG. 1 is a structural view illustrating a Coriolis flowmeter according to the present invention. FIG. 2 is a view illustrating the Coriolis flowmeter of FIG. 1, which is cut into a half along a horizontal direction. FIG. 3 is an enlarged view illustrating the region A of FIG. 2. FIGS. 4(a)-4(c) are views each illustrating a channel sectional shape including a channel branching portion. FIGS. 5(a)-5(d) are views each illustrating a channel sectional shape in a range of from the channel branching portion toward tube-side opening portions. FIGS. 6(a)-6(c) are views each illustrating a channel sectional shape including the tube-side opening portions. FIGS. 7(a) and 7(b) are views each illustrating a modification example of the channel sectional shape. FIG. 8 is a graph showing a change in sectional area. FIG. 9 is a graph showing the change in sectional area, including those of comparative examples. FIG. 10 is a graph showing pressure losses.

In FIGS. 1 and 2, a Coriolis flowmeter (or density meter) 1 of the present invention includes a pair of flow tubes 2, a drive (drive unit) 3, a pair of pickoffs (phase difference detection unit) 4, a temperature sensor (not shown), brace bars 5 arranged on an upstream side and a downstream side, an outer cylinder 6, a converter 7, and manifolds 8 arranged on the upstream side and the downstream side (on an inflow side and an outflow side). Further, the Coriolis flowmeter 1 is installed in the middle of a pipe (not shown) through intermediation of the manifolds 8.

The Coriolis flowmeter 1 of the present invention has a feature in the manifolds 8. Further, this feature enables optimization of a pressure loss and the like.

Firstly, the respective components of the Coriolis flowmeter 1 are described.

The pair of flow tubes 2 has a parallel straight tube shape, in which the flow tubes are arranged at a predetermined distance. The pair of flow tubes 2 as used herein has a circular cross section. The material for the pair of flow tubes 2 is a material that is generally used in this technical field, such as stainless steel, hastelloy, and titanium alloy. The manifolds 8 on the upstream side and the downstream side are arranged at both end portions 9 of the pair of flow tubes 2, respectively. A fluid to be measured (not shown) flows through the pair of flow tubes 2, and in this embodiment, the fluid to be measured flows in the arrow direction of FIG. 1.

The drive 3 is provided so as to vibrate the pair of flow tubes 2 with resonance. Such a drive 3 is arranged at a center position of the pair of flow tubes 2 in a longitudinal direction thereof. The pair of pickoffs 4 is provided so as to detect a vibration velocity of the pair of flow tubes 2 that is vibrated with resonance through the driving of the drive 3. Such a pair of pickoffs 4 is arranged at a predetermined distance from the drive 3. The temperature sensor (not shown) is arranged at the downstream end portion 9 of the pair of flow tubes 2.

The drive 3, the pair of pickoffs 4, and the temperature sensor (not shown) are electrically connected to the converter 7 via an electric wire 10. The converter 7 includes an arithmetic processing unit for performing predetermined arithmetic processing based on, for example, signals from the pair of pickoffs 4 and the temperature sensor (not shown), a control unit for performing various kinds of control, and an indication unit for indicating a result of the arithmetic processing.

Each of the brace bars 5 is a metal plate having a predetermined size, and is provided so as to connect the opposing flow tubes 2, in other words, to bridge the opposing flow tubes 2 (see FIG. 2). Each of the brace bars 5 is arranged between a maximum amplitude position and a fixed end (end portion 9) of the pair of flow tubes 2.

The outer cylinder 6 is a cylindrical member made of metal, and accommodates the pair of flow tubes 2 and the like inside. The manifolds 8 on the upstream side and the downstream side are fixed to both end portions 11 of such an outer cylinder 6.

Each of the manifolds 8 on the upstream side and the downstream side is a branching pipe formed by casting. The same manifolds 8 are arranged on the upstream side and the downstream side, and only the manifold 8 on the upstream side is described herein.

The manifold 8 includes a manifold body 12, a disc-like flange 13 integrated with one end of the manifold body 12, and a disc-like outer cylinder fixation portion 14 integrated with the other end of the manifold body 12.

The flange 13 is formed as a portion to be connected and fixed to the pipe (not shown). Further, the outer cylinder fixation portion 14 is formed as a portion for fixing the end portion 11 of the outer cylinder 6.

A channel 15 is formed in the manifold body 12 so as to pass therethrough from one end to the other end thereof. The channel 15 is a flow passage of the fluid to be measured (not shown), and in this embodiment, the channel 15 is formed so as to be branched into two channels corresponding to the two flow tubes 2. The channel 15 is set so as to be branched into as many channels as the flow tubes 2.

In FIG. 3, the channel 15 includes a pipe-side opening portion 16, tube-side opening portions 17, and a channel branching portion 18 as shaping portions therefor. The pipe-side opening portion 16 is a shaping portion opened at one end of the manifold body 12, and the tube-side opening portions 17 are shaping portions opened at the other end of the manifold body 12. That is, the pipe-side opening portion 16 is a portion arranged on the pipe side (not shown), and the tube-side opening portions 17 are portions arranged on the flow tube 2 side.

The pipe-side opening portion 16 is formed into a circular shape in conformity with a terminal opening shape on the pipe side (not shown). Further, the pipe-side opening portion 16 is formed at a diameter equal to the diameter of the above-mentioned terminal opening shape. On the other hand, each of the tube-side opening portions 17 is formed into a circular shape in conformity with a shape of the end portion 9 of the flow tube 2. Further, each of the tube-side opening portions 17 is formed at a diameter capable of inserting and fixing the end portion 9 in a watertight manner. Two tube-side opening portions 17 are arranged and formed at a distance equal to the distance between the pair of flow tubes 2.

The channel branching portion 18 is a portion for branching the channel 15 into two channels, and in this embodiment, the channel branching portion 18 is arranged in the vicinity of the pipe-side opening portion 16. A branching wall tip end 20 of a branching wall 19 extending from the position of the channel branching portion 18 to the other end of the manifold body 12 is arranged at the channel branching portion 18. The branching wall tip end 20 is a tip end of the branching wall 19, and is formed into a sharp edge. The channel 15 is immediately branched into two channels by the branching wall tip end 20 at the position of the channel branching portion 18. The channel 15 is bisected into right and left channels.

In addition to the above-mentioned branching wall tip end 20, the branching wall 19 has a pair of side surfaces extending to the other end side of the manifold body 12. The pair of side surfaces has flat surface portions 21 continuous with the branching wall tip end 20, curved surface portions 22 continuous with the tube-side opening portions 17, and intermediate portions 23 each formed between the flat surface portion 21 and the curved surface portion 22 for transition from the flat surface to the curved surface.

The sectional shape of the channel 15 is a circular shape at a position of the pipe-side opening portion 16, and is changed to a non-circular shape, that is, two D-shapes at the position of the channel branching portion 18 as a result of the bisection by the branching wall tip end 20. The D-shapes correspond to branching portion sectional shapes 26 (see FIG. 4(b)). Further, at a position ranging from the channel branching portion 18 to the tube-side opening portions 17, each of the side surfaces of the branching wall 19 is changed in an order of "flat surface portion 21"→"intermediate portion 23"→"curved surface portion 22", and hence the sectional shape is also changed in the following order from each of the branching portion sectional shapes 26. That is, the sectional shape is changed in an order of "D-shape-"→"substantially D-shape"→"substantially circular shape-"→"circular shape".

In the channel 15 having such a sectional shape, the sectional area is set so as to attain the following features. Specifically, the channel sectional area in a range of from the channel branching portion 18 toward the tube-side opening portions 17 is set so as not to become larger than the areas of the branching portion sectional shapes 26 (see FIG. 4(b)). More specifically, the channel sectional area in the range of from the channel branching portion 18 toward the tube-side opening portions 17 is set so as to be linearly decreased from the areas of the branching portion sectional shapes 26 (the channel sectional area is decreased in a linear fashion, provided that the channel sectional area is not decreased abruptly) (described later with reference to FIG. 8).

Note that, the linear decrease may be linear decrease that is as approximate to the imaginary line of FIG. 8 as possible. This case is also effective because the channel sectional area is not increased.

In addition to the above-mentioned settings, in this embodiment, the sectional area of the channel 15 in a range of from the pipe-side opening portion 16 toward the channel branching portion 18 is set so as to maintain the area of the opening shape (circular shape) of the pipe-side opening portion 16. Note that, when it is assumed that a long distance may be secured in the range of from the pipe-side opening portion 16 toward the channel branching portion 18, a transition portion toward complete branching may be formed. In this case, the channel sectional area at the transition portion is set so as not to become larger than the area of the opening shape (circular shape) of the pipe-side opening portion 16.

Now, the sectional shape of the channel 15 and the change in sectional area of the channel 15 are described in more detail.

A circular shape 24 illustrated in FIG. 4(a) is a sectional shape at the position of the pipe-side opening portion 16. The sectional area at this time corresponds to the first point from the left in FIG. 8. Two D-shapes 25 illustrated in FIG. 4(b) are sectional shapes at the position of the channel branching portion 18. In other words, the D-shapes 25 are the branching portion sectional shapes 26. The sectional area at this time corresponds to the second point from the left in FIG. 8. At the points subsequent to the second point, the sectional area is linearly decreased (the sectional area is decreased in a linear fashion with a gentle slope). Two D-shapes 27 illustrated in FIG. 4(c) are sectional shapes at positions of the flat surface portions 21 on the side surfaces of the branching wall 19, and are also sectional shapes immediately after the start of branching. The sectional area at this time corresponds to the third point from the left in FIG. 8.

Figure 5:
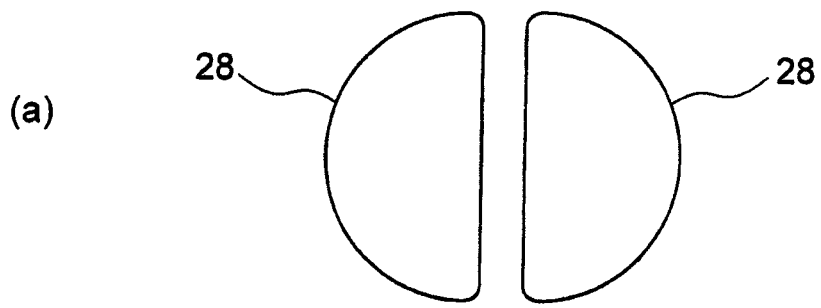
FIGS. 5(a)-5(d) are views each illustrating a channel sectional shape in a range of from the channel branching portion toward tube-side opening portions.
Figure 5:
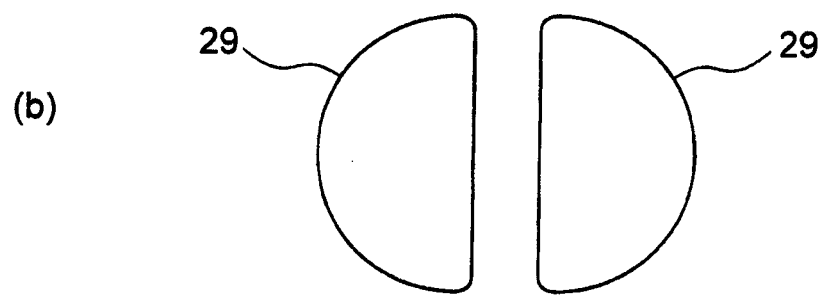
Figure 5:
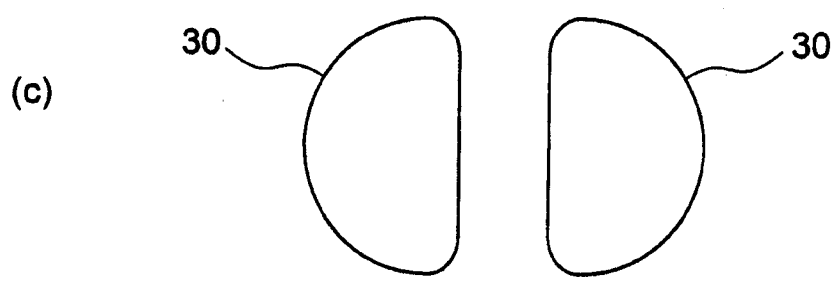
Figure 5:
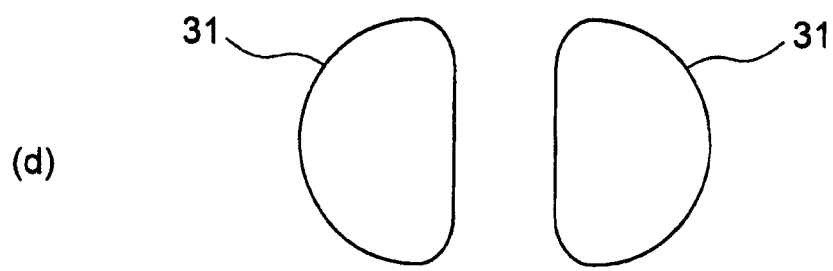

Two D-shapes 28 and 29 illustrated in FIGS. 5(a) and 5(b) are sectional shapes at the positions of the flat surface portions 21 on the side surfaces of the branching wall 19. The sectional area at this time corresponds to the fourth and fifth points from the left in FIG. 8. Two substantially D-shapes 30 and 31 illustrated in FIGS. 5(c) and 5(d) are sectional shapes at positions of the intermediate portions 23 on the side surfaces of the branching wall 19. The sectional area at this time corresponds to the sixth and seventh points from the left in FIG. 8.

Two substantially circular shapes 32 illustrated in FIG. 6(a) are sectional shapes at positions of the curved surface portions 22 on the side surfaces of the branching wall 19. The sectional area at this time corresponds to the eighth point from the left (third point from the right) in FIG. 8. Two circular shapes 33 and 34 illustrated in FIGS. 6(b) and 6(c) are sectional shapes at the positions of the curved surface portions 22 on the side surfaces of the branching wall 19 and at positions of the tube-side opening portions 17. The sectional area at this time corresponds to the ninth and tenth points from the left (second and first points from the right) in FIG. 8.

Note that, as the change in sectional shape of the channel 15, in the above description, there is employed such a change in shape that each sectional shape 35 is line-symmetrical across the center line C as illustrated in FIG. 7(a). However, the present invention is not limited thereto. That is, there may be employed such a change in shape that the regions indicated by the arrows Q and R have different shapes in each sectional shape 36 as illustrated in FIG. 7(b).

The channel 15 is formed into the following shape. That is, the channel 15 is formed into a shape having no abrupt flow contraction region or enlarged region in the range of from the channel branching portion 18 toward the tube-side opening portions 17. Now, the change in sectional area of the channel 15 (in the range of from the channel branching portion 18 toward the tube-side opening portions 17) and comparative examples thereof are described with reference to FIG. 9. Further, pressure losses are described with reference to FIG. 10.

In FIG. 9, the plot indicated by the symbol "o" represents the change in sectional area of the channel 15, and is the same plot as that of FIG. 8. On the other hand, the plot indicated by the symbol "◇" represents a change in sectional area of Comparative Example 1. Further, the plot indicated by the symbol "Δ" represents a change in sectional area of Comparative Example 2, and the plot indicated by the symbol "□" represents a change in sectional area of Comparative Example 3.

In the case of the channel 15, which is shown in the plot indicated by the symbol "o", the sectional area is linearly decreased toward the right side along the horizontal axis. In Comparative Example 1, which is shown in the plot indicated by the symbol "◇", on the other hand, the channel sectional area is increased immediately after the branching, and then the flow is contracted abruptly. The pressure loss of Comparative Example 1, which involves such a change in sectional area, is shown in the plot indicated by the symbol "◇" of FIG. 10. The plot indicated by the symbol "o" under the plot indicated by the symbol "◇" represents a pressure loss of the channel 15. It is understood from the graph that the case involving the increase in channel sectional area immediately after the branching followed by the abrupt flow contraction is a factor in causing the increase in pressure loss.

Referring back to FIG. 9, in Comparative Example 2, which is shown in the plot indicated by the symbol "Δ", similarly to Comparative Example 1, the channel sectional area is increased immediately after the branching, and then the flow is contracted relatively abruptly. Thus, although not particularly shown, the pressure loss of Comparative Example 2 is larger than that of the channel 15 as well.

Comparative Example 3, which is shown in the plot indicated by the symbol "□", is an example in which the channel sectional area is not increased. However, the change in sectional area is not constant and the flow is contracted abruptly in several regions. Although not particularly shown, also in the case where the change in sectional area is not constant and the flow is contracted abruptly in several regions, the pressure loss is larger than that of the channel 15.

In the case of the channel 15, the channel sectional area is linearly decreased (the channel sectional area is decreased in a linear fashion with a gentle slope). Thus, it is understood that there is no enlarged region or abrupt flow contraction region and the pressure loss is therefore smallest among the above-mentioned examples.

As described above, the channel 15 of the manifold 8 includes the pipe-side opening portion 16, the tube-side opening portions 17, and the channel branching portion 18 as the shaping portions therefor, and the channel sectional area in the range of from the channel branching portion 18 toward the tube-side opening portions 17 is linearly decreased so that the channel sectional area is not increased. Thus, such an effect is attained that suppression of the pressure loss and the like, that is, optimization of the pressure loss and the like can be achieved.

Second Embodiment

Figure 11:
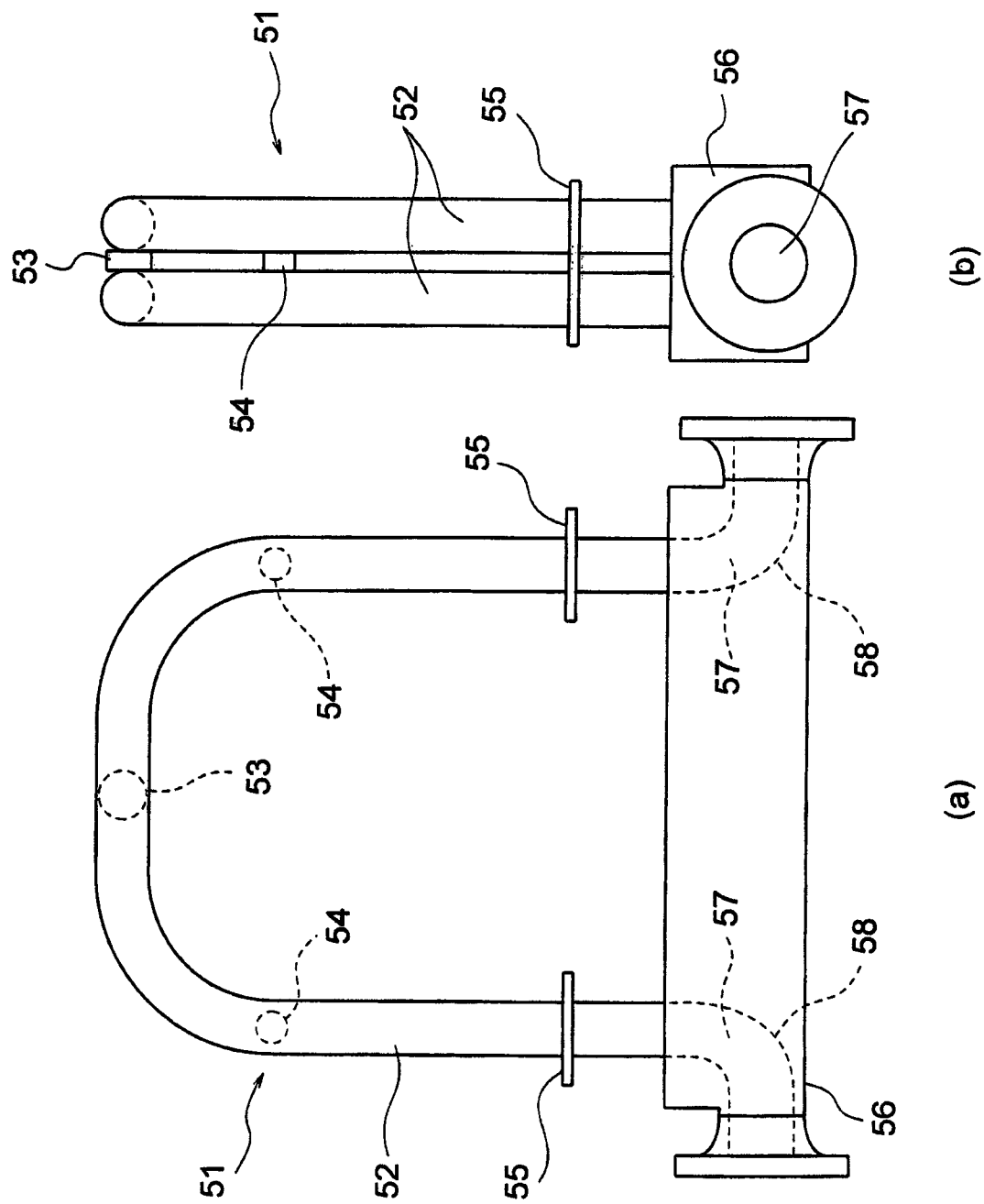
FIGS. 11(a) and 11(b) are structural views each illustrating another example of the Coriolis flowmeter.
Figure 12:
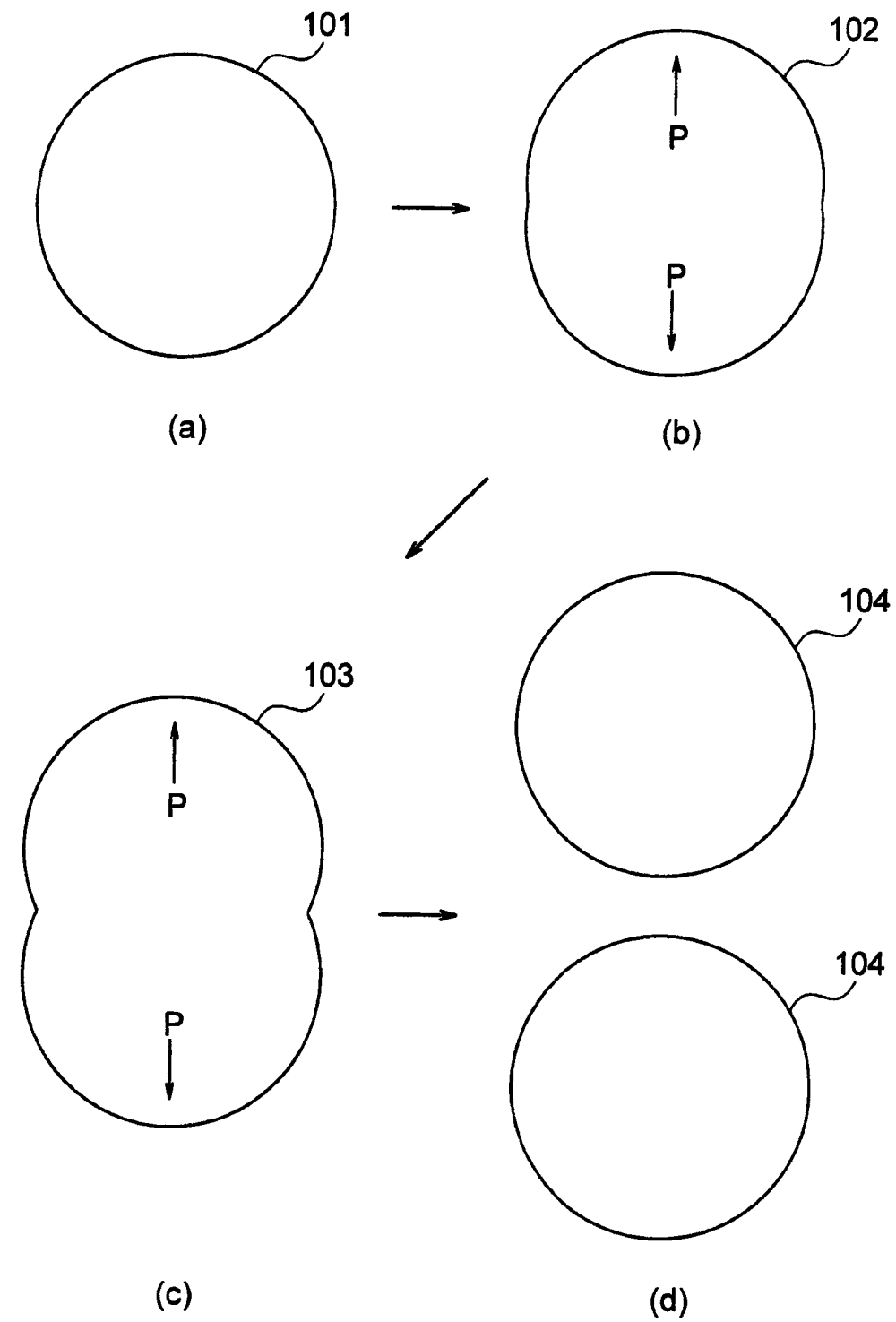
FIGS. 12(a)-12(d) are views each illustrating a related-art channel sectional shape.

Now, a second embodiment of the present invention is described with reference to the drawings. FIG. 11 are structural views each illustrating another example of the Coriolis flowmeter.

In FIG. 11, a Coriolis flowmeter (or density meter) 51 includes a pair of flow tubes 52 having a portal shape, a drive (drive unit) 53, a pair of pickoffs (phase difference detection unit) 54, a temperature sensor (not shown), brace bars 55 arranged on an upstream side and a downstream side, and manifolds 56 arranged on the upstream side and the downstream side (on an inflow side and an outflow side). Further, the Coriolis flowmeter 51 is installed in the middle of a pipe (not shown) through intermediation of the manifolds 56.

The manifold 56 has the features of the manifold 8 (see FIG. 3) of the first embodiment. That is, the manifold 56 has a channel 57 formed so that the channel sectional area is not increased. The pair of flow tubes 52 has the portal shape, and hence the channel 57 is formed so as to have a curved shape 58.

Needless to say, the Coriolis flowmeter 51 attains the same effect as that of the first embodiment.

Besides, as a matter of course, various modifications may be made to the present invention without departing from the gist of the present invention.

In the above description, the number of the flow tubes 2 (52) is two, but the present invention is not limited thereto. The number of the flow tubes 2 (52) may be four, six, or the like. Note that, the present invention is also applicable to a case where the number of the flow tubes 2 (52) is three or five (in this case, however, the structure of the flowmeter becomes complicated).

REFERENCE SIGNS LIST

1 . . . Coriolis flowmeter (or density meter)
2 . . . flow tube
3 . . . drive
4 . . . pickoff
5 . . . brace bar
6 . . . outer cylinder
7 . . . converter
8 . . . manifold
9 . . . end portion
10 . . . electric wire
11 . . . end portion
12 . . . manifold body
13 . . . flange
14 . . . outer cylinder fixation portion
15 . . . channel
16 . . . pipe-side opening portion
17 . . . tube-side opening portion
18 . . . channel branching portion
19 . . . branching wall
20 . . . branching wall tip end
21 . . . flat surface portion
22 . . . curved surface portion
23 . . . intermediate portion
24 . . . circular shape
25 . . . D-shape
26 . . . branching portion sectional shape
27, 28, 29 . . . D-shape
30, 31 . . . substantially D-shape
32, 33 . . . substantially circular shape
34 . . . circular shape
35, 36 . . . sectional shape
51 . . . Coriolis flowmeter (or density meter)
52 . . . flow tube
53 . . . drive
54 . . . pickoff
55 . . . brace bar
56 . . . manifold
57 . . . channel
58 . . . curved shape

The invention claimed is:

1. A Coriolis flowmeter configured to drive flow tubes and detect a phase difference and/or a vibration frequency proportional to a Coriolis force acting on each of the flow tubes, to thereby determine a mass flow rate and/or density of a fluid to be measured, which flows through the each of the flow tubes,
the Coriolis flowmeter comprising manifolds arranged at both end portions of the each of the flow tubes,
wherein a number of the flow tubes is set to two,
wherein a channel of each of the manifolds comprises, as shaping portions therefor:
a pipe-side opening portion arranged close to a pipe to which the Coriolis flowmeter is to be installed;
tube-side opening portions arranged close to the flow tubes, a number of the tube-side opening portions being equal to the two flow tubes; and
a channel branching portion to be branched corresponding to the two flow tubes,
wherein areas of branching portion sectional shapes of the channel branching portion are set equal to each other,
wherein a channel sectional area in a range of from the channel branching portion toward the tube-side opening portions is set so as to be prevented from becoming larger than the areas of the branching portion sectional shapes,
wherein each of the branching portion sectional shapes of the channel branching portion has a D-shape, and a shape of each of the tube-side opening portions has a circular shape, and
wherein the channel sectional area in the range of from the channel branching portion toward the tube-side opening portions linearly decreases from the areas of the branching portion sectional shapes.

2. A Coriolis flowmeter according to claim 1, wherein a sectional shape of the channel in the range of from the channel branching portion toward the tube-side opening portions is changed in a order of the D-shape, a substantially D-shape, a substantially circular shape, and the circular shape.

3. A Coriolis flowmeter according to claim 2, further comprising a branching wall having a branching wall tip end formed into a sharp edge, and a pair of flat surface portions continuous with the branching wall tip end, the branching wall tip end being arranged at a position of the channel branching portion.

4. A Coriolis flowmeter according to claim 3,
wherein each of the flow tubes has a straight tube shape and a region in the range of from the channel branching portion toward the tube-side opening portions has a shape extending straight, or each of the flow tubes has a curved tube shape and the region in the range of from the channel branching portion toward the tube-side opening portions is formed into a curved shape.

5. A Coriolis flowmeter according to claim 3,
wherein the branching wall further has curved surface portions that are continuous with the tube-side opening portions, and intermediate portions each formed between one of the flat surface portions and one of the curved surface portions for transition from a flat surface to a curved surface.

6. A Coriolis flowmeter according to claim 5,
wherein each of the flow tubes has a straight tube shape and a region in the range of from the channel branching portion toward the tube-side opening portions has a shape extending straight, or each of the flow tubes has a curved tube shape and the region in the range of from the channel branching portion toward the tube-side opening portions is formed into a curved shape.

7. A Coriolis flowmeter according to claim 2,
wherein each of the flow tubes has a straight tube shape and a region in the range of from the channel branching portion toward the tube-side opening portions has a shape extending straight, or each of the flow tubes has a curved tube shape and the region in the range of from the channel branching portion toward the tube-side opening portions is formed into a curved shape.

8. A Coriolis flowmeter according to claim 2, further comprising a transition portion arranged between the channel branching portion and the pipe-side opening portion, the transition portion being formed as a portion at which the channel sectional area is set so as to be prevented from becoming larger than an area of an opening shape of the pipe-side opening portion, and as a portion secured toward complete branching.

9. A Coriolis flowmeter according to claim 1, further comprising a branching wall having a branching wall tip end formed into a sharp edge, and a pair of flat surface portions continuous with the branching wall tip end, the branching wall tip end being arranged at a position of the channel branching portion.

10. A Coriolis flowmeter according to claim 9,
wherein each of the flow tubes has a straight tube shape and a region in the range of from the channel branching portion toward the tube-side opening portions has a shape extending straight, or each of the flow tubes has a curved tube shape and the region in the range of from the channel branching portion toward the tube-side opening portions is formed into a curved shape.

11. A Coriolis flowmeter according to claim 9, further comprising a transition portion arranged between the channel branching portion and the pipe-side opening portion, the transition portion being formed as a portion at which the channel sectional area is set so as to be prevented from becoming larger than an area of an opening shape of the pipe-side opening portion, and as a portion secured toward complete branching.

12. A Coriolis flowmeter according to claim 9,
wherein the branching wall further has curved surface portions that are continuous with the tube-side opening portions, and intermediate portions each formed between one of the flat surface portions and one of the curved surface portions for transition from a flat surface to a curved surface.

13. A Coriolis flowmeter according to claim 12,
wherein each of the flow tubes has a straight tube shape and a region in the range of from the channel branching portion toward the tube-side opening portions has a shape extending straight, or each of the flow tubes has a curved tube shape and the region in the range of from the channel branching portion toward the tube-side opening portions is formed into a curved shape.

14. A Coriolis flowmeter according to claim 12, further comprising a transition portion arranged between the channel branching portion and the pipe-side opening portion, the transition portion being formed as a portion at which the channel sectional area is set so as to be prevented from becoming larger than an area of an opening shape of the pipe-side opening portion, and as a portion secured toward complete branching.

15. A Coriolis flowmeter according to claim 1,
wherein each of the flow tubes has a straight tube shape and a region in the range of from the channel branching portion toward the tube-side opening portions has a shape extending straight, or each of the flow tubes has a curved tube shape and the region in the range of from the channel branching portion toward the tube-side opening portions is formed into a curved shape.

16. A Coriolis flowmeter according to claim 1, further comprising a transition portion arranged between the channel branching portion and the pipe-side opening portion, the transition portion being formed as a portion at which the channel sectional area is set so as to be prevented from becoming larger than an area of an opening shape of the pipe-side opening portion, and as a portion secured toward complete branching.

* * * * *